United States Patent
Yahagi

[11] Patent Number: 5,764,420
[45] Date of Patent: Jun. 9, 1998

[54] ZOOM LENS

[75] Inventor: Satoshi Yahagi, Omiya, Japan

[73] Assignee: Fuji Photo Optical Co., Ltd., Omiya, Japan

[21] Appl. No.: 653,688

[22] Filed: May 23, 1996

[30] Foreign Application Priority Data

Jun. 29, 1995 [JP] Japan .................................. 7-186310

[51] Int. Cl.$^6$ .................................................. G02B 15/14
[52] U.S. Cl. .......................... 359/682; 359/684; 359/685; 359/688
[58] Field of Search .................................. 359/682, 684, 359/685, 688, 753, 765

[56] References Cited

U.S. PATENT DOCUMENTS

| | | | |
|---|---|---|---|
| 3,442,573 | 5/1969 | Macher | 359/684 |
| 3,594,066 | 7/1971 | Cook et al. | 359/684 |
| 3,922,070 | 11/1975 | Macher | 359/684 |
| 4,364,642 | 12/1982 | Tanaka et al. | 359/684 |
| 4,492,437 | 1/1985 | Masumoto et al. | 359/684 |
| 4,702,567 | 10/1987 | Kato et al. | 359/684 |
| 4,789,227 | 12/1988 | Tanaka et al. | 359/684 |
| 4,840,468 | 6/1989 | Tanaka | 359/684 |
| 4,842,385 | 6/1989 | Tanaka | 359/684 |
| 4,874,231 | 10/1989 | Aono | 359/684 |
| 5,009,492 | 4/1991 | Hamano | 359/684 |
| 5,136,431 | 8/1992 | Terasawa et al. | 359/684 |
| 5,221,994 | 6/1993 | Nishio | 359/684 |
| 5,299,064 | 3/1994 | Hamano et al. | 359/684 |
| 5,301,064 | 4/1994 | Sugi et al. | 359/684 |
| 5,341,243 | 8/1994 | Okuyama et al. | 359/684 |
| 5,363,242 | 11/1994 | Yokota | 359/684 |
| 5,414,562 | 5/1995 | Ueda | 359/684 |

*Primary Examiner*—Georgia Y. Epps
*Assistant Examiner*—Evelyn A. Lester
*Attorney, Agent, or Firm*—Ronald R. Snider

[57] ABSTRACT

A zoom lens comprising five lens groups is configured such that the total moving amount of the second lens group from the wide angle end to the telephotographic end is changed according to the object distance and that the fourth lens group is moved so as to correct zooming and focusing, whereby the imaging magnification is prevented from decreasing at the time of zooming even when the object distance changes. It comprises five lens groups respectively having positive, negative, negative, positive, and positive refractive powers. At the time of zooming, the first, third, and fifth lens groups (G1, G3, and G5) are fixed, while the second and fourth lens groups (G2 and G4) are made movable. The second lens group (G2) is moved in the optical axis direction so as to change the focal length of the whole system, while the fourth lens group (G4) is moved in the optical axis direction to correct fluctuation in the imaging position and to correct change in the imaging position caused by change in the object distance. The moving amount of the second lens group (G2) at the time of zooming is made larger when the object is placed at a close telephotographic position than when the object distance is at an infinite telephotographic position.

2 Claims, 4 Drawing Sheets

CHANGE IN MAGNIFICATION ACCORDING
TO OBJECT DISTANCE (EMBODIMENT)

CHANGE IN MAGNIFICATION ACCORDING
TO OBJECT DISTANCE (PRIOR ART)

ZOOM LENS

RELATED APPLICATIONS

This application claims the priority of Japanese Patent Application No. 7-186310 filed on Jun. 29, 1995, which is incorporated herein by reference.

BACKGROUND OF THE INVENTION

1. Field of the Invention

The present invention relates to a zoom lens and, in particular, to a zoom lens for a television camera used for broadcasting and business purposes.

2. Description of the Prior Art

In a zoom lens, its variable power ratio generally called "zoom ratio" is defined by the ratio of the focal length of the whole lens system at the wide angle end to that at the telephotographic end when the object distance is at infinity. In most of the conventional zoom lenses, their focus adjusting mechanism is placed between the variable power mechanism and the object. In such a zoom lens, the ratio of the imaging magnification at the wide angle end to that at the telephotographic end is equal to the zoom ratio defined above. Accordingly, no matter where the object is placed within the range from a close position to infinity, the imaging ratio has been sufficiently expressed by the zoom ratio based on the above-mentioned focal length ratio.

Recently, in addition to the above-mentioned type of zoom lens, so-called rear focus type zoom lens in which the focus adjusting mechanism is placed between the variable power mechanism and the image has come into use.

In the latter type, in the case where the zoom ratio is defined by the ratio of the focal length of the whole lens system at the wide angle end to that at the telephotographic end when the object distance is at infinity as mentioned above, the ratio of the imaging magnification at the wide angle end to that at the telephotographic end may differ from the zoom ratio when the object position is at a finite distance.

In particular, in the case of a zoom lens composed of five lens groups respectively having positive, negative, negative, positive, and positive refractive powers arranged successively from the object side, in which, while the first, third, and fifth lens groups are fixed, the second lens group is moved in the optical axis direction so as to change the focal length of the whole system and the fourth lens is moved in the optical axis direction so as to correct the fluctuation of the imaging position, the actual imaging magnification ratio becomes lower than the above-mentioned focal length ratio more remarkably as zooming approaches the telephotographic end from the wide angle end as shown in FIG. 5 when the total moving amount of the second lens group is fixed regardless of the object distance at the time of zooming.

Namely, in the zoom lens actually in use, when zooming is effected while being close to an object, the image of this object may not be magnified to an expected extent.

SUMMARY OF THE INVENTION

In view of such a circumstance, the object of the present invention is to provide a rear focus type zoom lens which can make the ratio of the imaging magnification at the wide angle end to that of the telephotographic end at the time of zooming when the object distance is finite coincide with the ratio of the focal length of the whole lens system at the wide angle end to that at the telephotographic end when the object distance is infinite.

In order to achieve the above-mentioned object, the present invention provides a zoom lens in which the total moving amount from the wide angle end to the telephotographic end of its lens group which contributes to a variable power is changed according to the distance from a target object so as to make the ratio of the imaging magnification at the wide angle end to that at the telephotographic end in zooming when the object distance is finite coincide with the ratio of the focal length of the whole lens system at the wide angle end to that at the telephotographic end when the object distance is infinite.

More specifically, in accordance with the present invention, for example, successively from the object side, a first lens having a positive refractive power, a second lens group having a negative refractive power, a third lens group having a negative refractive power, a fourth lens group having a positive refractive power, and a fifth lens group having a positive refractive power are disposed and, while the first, third, and fifth lens groups are fixed, the second lens group is moved in the optical axis direction so as to change the focal length of the whole system and the fourth lens group is moved in the optical axis direction so as to correct the fluctuation of the imaging position and simultaneously correct change in the imaging position caused by change in the object distance, with the moving amount of the second lens group from the wide angle end to the telephotographic end being reduced according to increase in the distance from the target object such that the ratio of the imaging magnification at the wide angle end to that of the telephotographic end in zooming when the object distance is finite coincides with the ratio of the focal length of the whole lens system at the wide angle end to that at the telephotographic end when the object distance is infinite.

The problem of the prior art is overcome in the zoom lens of the present invention due to the configuration mentioned above. Namely, in the conventional zoom lenses, even in the case where they are of rear focus type, the total moving amount of the lens group contributing to a variable power for the object at a finite distance has been made identical to that for the object at infinite. In this case, when the object is at a finite distance, the actual ratio of the imaging magnification at the wide angle end to that at the telephotographic end largely deviates from the zoom ratio defined by the focal length ratio.

Accordingly, in the zoom lens of the present invention, the total moving amount is changed according to the distance from the target object so as to compensate for the deviation of the imaging magnification ratio from the focal length ratio which is generated when the object is at a finite distance.

Also, in the above-mentioned specific example, the moving amount of the second lens group, which mainly contributes to the variable power, is made greater when the object is at a finite distance than when the object is at infinite, whereby the actual ratio of the imaging magnification at the wide angle end to that at the telephotographic end when the object is at a finite distance can coincide with the zoom ratio which is defined as mentioned above. Therefore, in the case where the zoom lens is actually used, even when zooming is effected while being close to an object, an image of this object can be magnified to an expected extent.

DETAILED DESCRIPTION OF THE PREFERRED EMBODIMENTS

In the following, an embodiment of the present invention will be explained in detail with reference to drawings.

Figure 1:
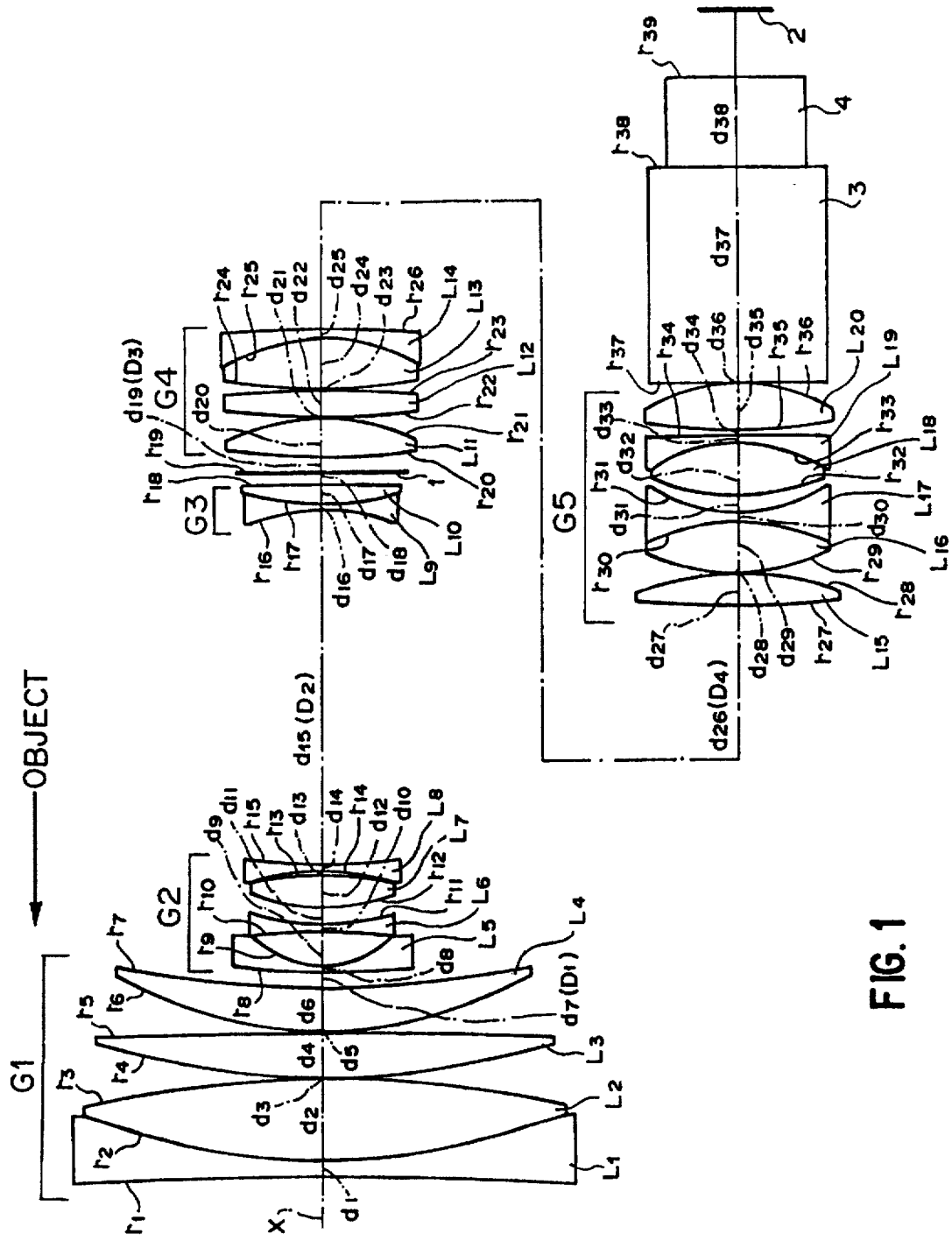
FIG. 1 is a view showing a lens configuration of a zoom lens in accordance with an embodiment of the present invention at its wide angle end.
Figure 2:
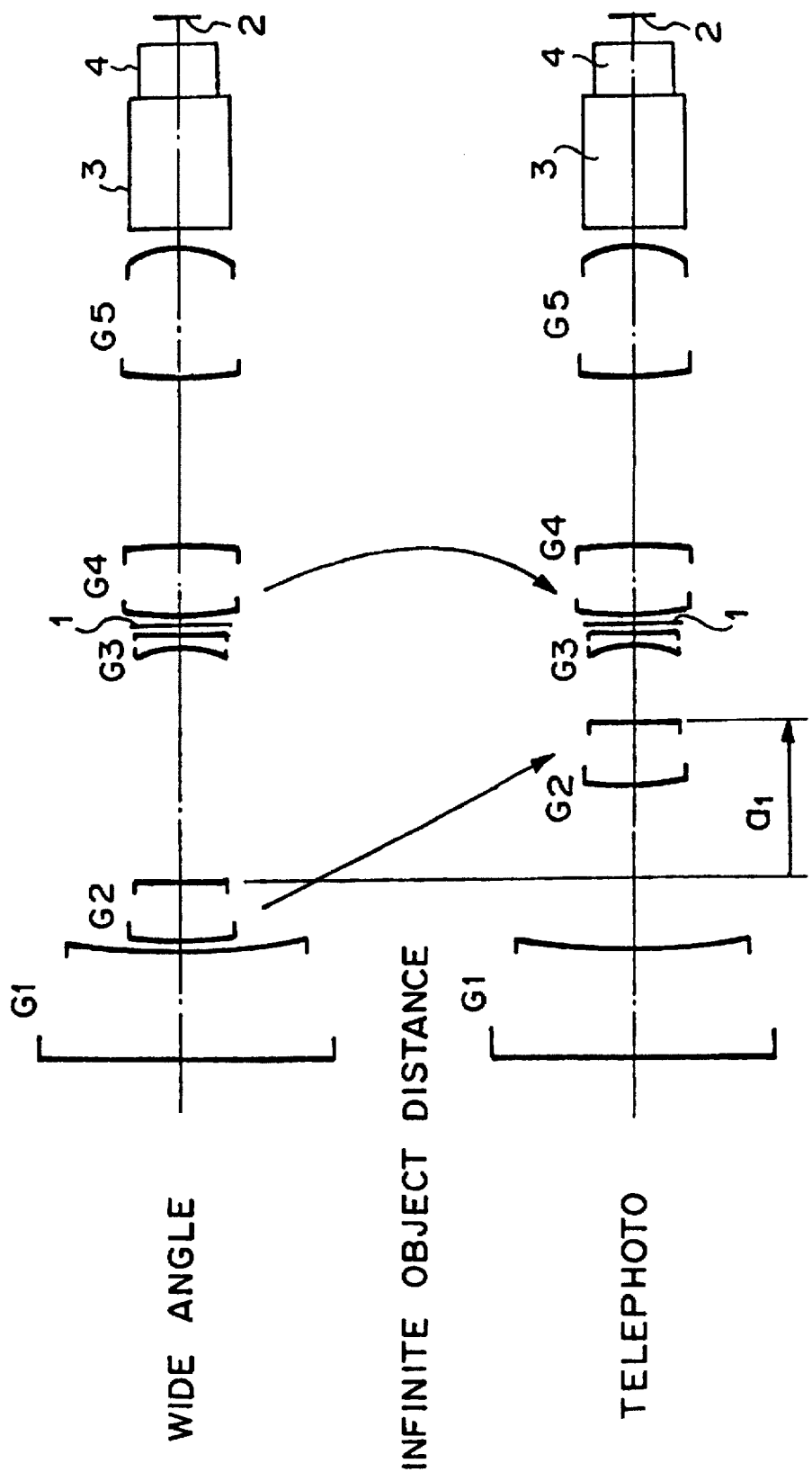
FIG. 2 is a schematic view showing a locus of movement of each lens group from the wide angle end to the telephotographic end in the zoom lens in accordance with the embodiment the present invention when the object distance is infinite.
Figure 3:
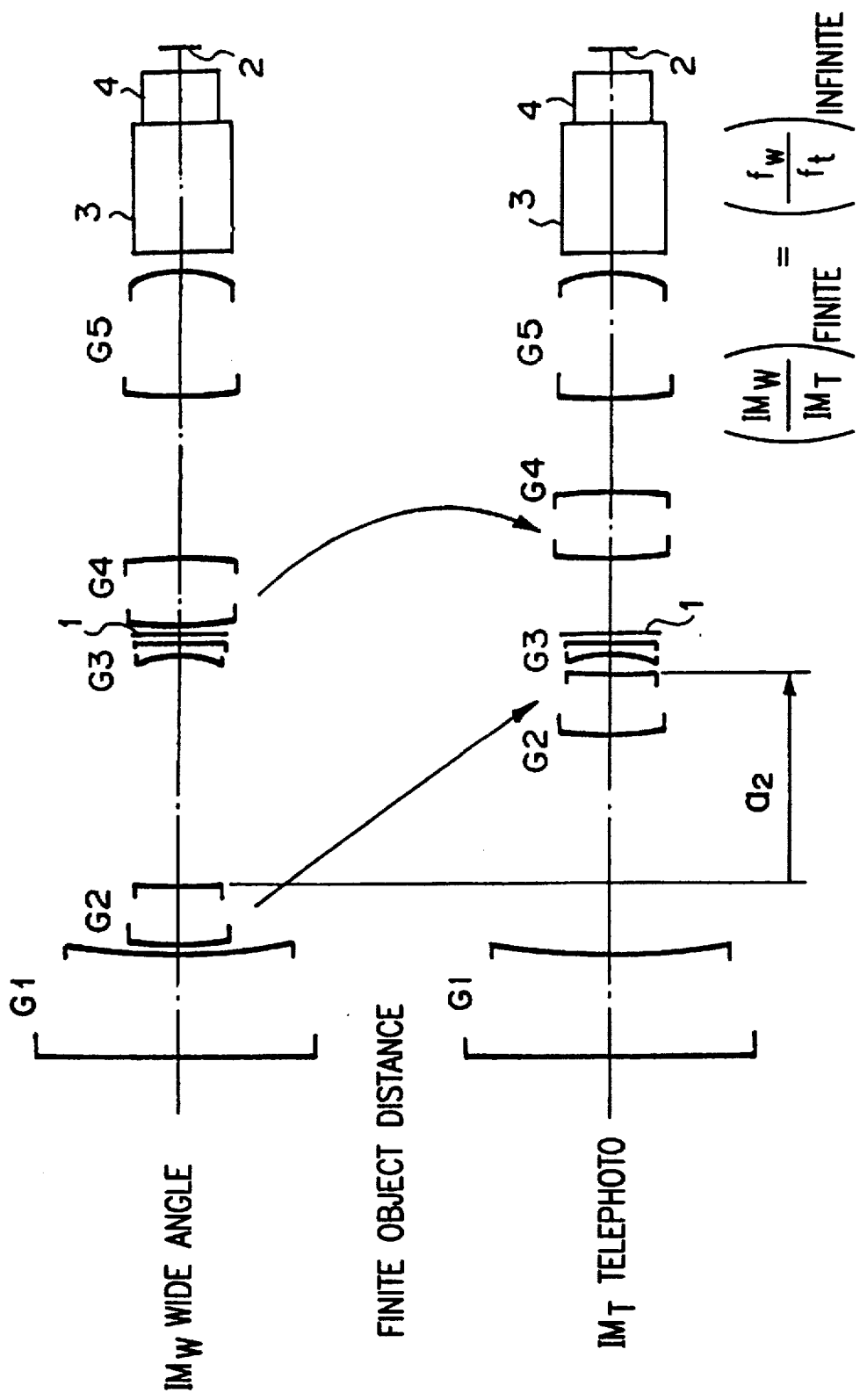
FIG. 3 is a schematic view showing a locus of movement of each lens group from the wide angle end to the telephotographic end in the zoom lens in accordance with the embodiment of the present invention when the object is placed at a close position.

FIG. 1 is a lens diagram showing the configuration of an embodiment of the zoom lens in accordance with the present invention at its wide angle end; FIG. 2 is a view showing the locus of movement of each lens from the wide angle end to the telephotographic end when the object distance is at infinite; and FIG. 3 is a view showing the locus of movement of each lens from the wide angle end to the telephotographic end when the object is placed at a close position.

The zoom lens shown in FIG. 1 comprises, successively from the object side, a first lens group G1 having a positive refractive power as a whole, a second lens group G2 having a negative refractive power as a whole, a third lens group G3 having a negative refractive power as a whole, a stop 1, a fourth lens group G4 having a positive refractive power as a whole, and a fifth lens group G5 having a positive refractive power as a whole. At the time of zooming, the first lens group G1, the third lens group G3, and the fifth lens group G5 are fixed, while the second lens group G2 and the fourth lens group G4 are made movable. The second lens group G2 is moved along an optical axis X to correct focal length f of the whole system, while the fourth lens group G4 is moved along the optical axis X to correct the fluctuation in the imaging position caused by the movement of the second lens group G2 and to correct change in the imaging position caused by change in the object distance. Also, this zoom lens is configured such that the total moving amount of the second lens group G2 from the wide angle end to the telephotographic end is changed according to the object distance.

Next, movement of these lens groups G1 to G5 will be explained with reference to FIGS. 2 and 3. When the object distance is at infinite, the moving amount of the second lens group G2 from the wide angle end to the telephotographic end is defined by $a_1$. In this case, the fourth lens group G4 moves to a position closest to the image at a middle region in the variable power, whereas it approaches the fixed third lens group G3 at the telephotographic end. When the object is placed at a close position, as shown in FIG. 3, the moving amount of the second lens group G2 from the wide angle end to the telephotographic end is defined by $a_2$ which is greater than the above-mentioned $a_1$. In this case, the fourth lens group G4 moves to a position closest to the image at a middle region in the variable power, whereas it approaches the fixed third lens group G3 at the telephotographic end, with the distance between the two lens groups G3 and G4 at the telephotographic end being greater than that in the above-mentioned case where the object distance is at infinite.

Here, when the object is placed between infinite and the close position, the moving amount of the second lens group G2 becomes a value between $a_1$ and $a_2$.

Thus, the moving amount of the second lens group G2 from the wide angle end to the telephotographic end is greater when the object is placed at a close position than when the object distance is at infinite, and the fourth lens group G4 moves so as to correct the fluctuation in the imaging position caused by the movement of the second lens group G2 in each of these cases.

Figure 4:
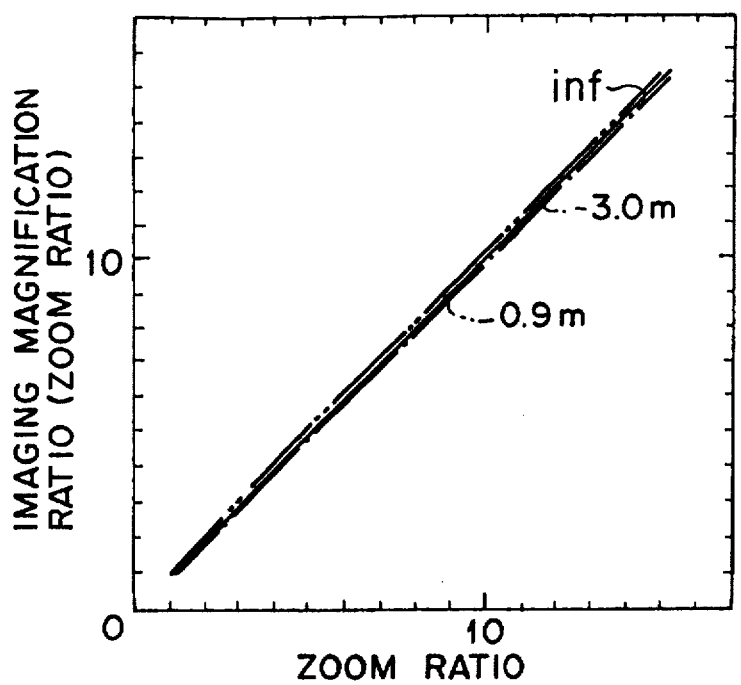
FIG. 4 is a graph showing a relationship between change in zoom ratio and change in imaging magnification ratio according to the object distance when the zoom lens in accordance with the embodiment of the present invention is used.
Figure 5:
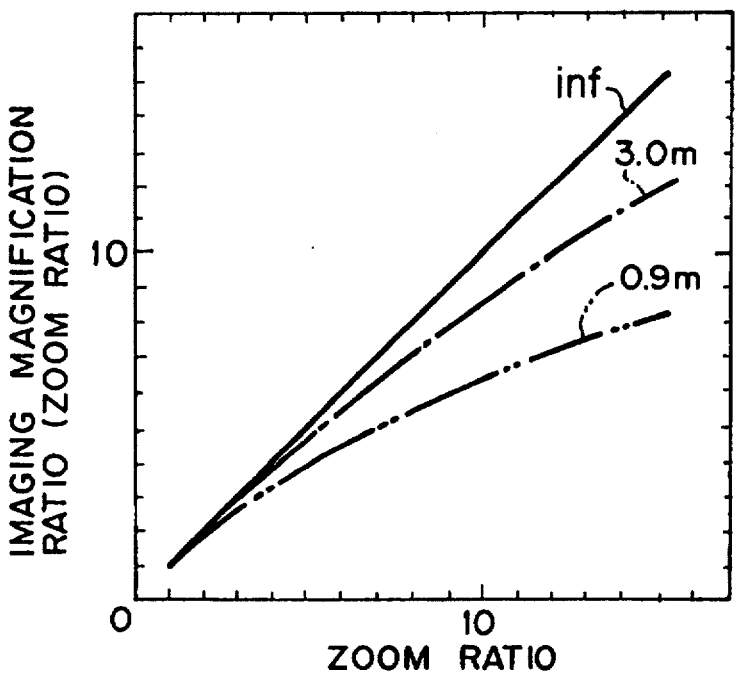
FIG. 5 is a graph showing a relationship between change in zoom ratio and change in imaging magnification ratio according to the object distance when a conventional zoom lens is used.

In thus configured embodiment, as shown in FIG. 4, no matter where the object is placed within the range from infinite to a close position, the ratio of the imaging magnification at the wide angle end to that at the telephotographic end can be made to coincide with the focal distance ratio thereof. In this respect, it is clear that the present invention is greatly improved over the conventional example having a characteristic such as that shown in FIG. 5.

Further, the first lens group G1 comprises lenses $L_1$ to $L_4$; the second lens group G2 comprises lenses $L_5$ to $L_8$; the third lens group G3 comprises lenses $L_9$ and $L_{10}$; the fourth lens group G4 comprises lenses $L_1$ to $L_{14}$; and the fifth lens group G5 comprises lenses $L_{15}$ to $L_{20}$.

Also, between the fifth lens group G5 and an imaging surface 2, a trichromatic decomposing prism 3, and an optical element group (depicted as a single block in the drawings) 4, which comprises an infrared cutoff filter, a low-pass filter, and a CCD cover glass, are disposed.

The following Table 1 shows radius of curvature R (mm) of each lens surface, center thickness of each lens and air gap between neighboring lenses (collectively referred to as "axial surface distance" hereinafter) d (mm), refractive index N of each lens at d-line, and Abbe number ν of each lens in the zoom lens in accordance with this embodiment.

Here, the numbers in the table successively increase from the object side.

Also, the following Table 2 shows values of $D_1$, $D_2$, $D_3$, and $D_4$ in the column of axial surface distance in Table 1 at their wide angle position, close telephotographic position, and infinite telephotographic position.

TABLE 1

| m | R | d | N | υ |
|---|---|---|---|---|
| 1 | −564.488 | 2.40 | 1.80517 | 25.4 |
| 2 | 102.061 | 11.72 | 1.48749 | 70.4 |
| 3 | −153.475 | 0.12 | | |
| 4 | 116.494 | 6.67 | 1.63854 | 55.5 |
| 5 | −836.974 | 0.12 | | |
| 6 | 59.424 | 6.54 | 1.71700 | 47.8 |
| 7 | 157.616 | D1 | | |
| 8 | 119.609 | 0.80 | 1.83500 | 43.0 |
| 9 | 14.692 | 5.08 | | |
| 10 | −62.964 | 0.80 | 1.83400 | 37.3 |
| 11 | 36.792 | 2.38 | | |
| 12 | 27.910 | 4.77 | 1.84665 | 23.9 |
| 13 | −43.676 | 0.52 | | |
| 14 | −32.603 | 0.80 | 1.77250 | 49.6 |
| 15 | 95.260 | D2 | | |
| 16 | −29.306 | 0.81 | 1.77250 | 49.6 |
| 17 | 40.980 | 2.87 | 1.84665 | 23.9 |
| 18 | −1303.585 | 1.60 | | |
| 19 | Stop | D3 | | |
| 20 | 87.858 | 5.52 | 1.51824 | 58.9 |

TABLE 1-continued

| m | R | d | N | υ |
|---|---|---|---|---|
| 21 | −32.230 | 0.12 | | |
| 22 | 134.999 | 3.70 | 1.58313 | 59.3 |
| 23 | −153.073 | 0.12 | | |
| 24 | 85.899 | 7.22 | 1.48749 | 70.4 |
| 25 | −27.199 | 1.25 | 1.80501 | 39.6 |
| 26 | −244.941 | D4 | | |
| 27 | 155.969 | 4.64 | 1.48749 | 70.4 |
| 28 | −40.564 | 0.12 | | |
| 29 | 30.450 | 7.34 | 1.51742 | 52.1 |
| 30 | −28.240 | 1.30 | 1.83500 | 43.0 |
| 31 | 23.091 | 2.28 | | |
| 32 | 32.114 | 7.13 | 1.51454 | 54.6 |
| 33 | −23.279 | 1.25 | 1.80610 | 40.7 |
| 34 | −359.663 | 0.67 | | |
| 35 | 65.625 | 7.10 | 1.48749 | 70.4 |
| 36 | −24.924 | 1.00 | | |
| 37 | ∞ | 33.00 | 1.58267 | 46.5 |
| 38 | ∞ | 13.20 | 1.51633 | 64.0 |
| 39 | ∞ | | | |

TABLE 2

| | Wide angle end | Terephoto (∞) | Terephoto (close) |
|---|---|---|---|
| $D_1$ | 2.10 | 52.87 | 58.64 |
| $D_2$ | 60.00 | 9.23 | 3.47 |
| $D_3$ | 2.07 | 1.55 | 3.87 |
| $D_4$ | 39.99 | 40.50 | 38.18 |

The zoom lens of the present invention should not be restricted to the above-mentioned embodiment. For example, the number and form of lenses constituting each lens group can be arbitrarily selected.

What is claimed is:

1. A rear focus type zoom lens having a focus adjusting mechanism placed between a variable power mechanism and an image wherein a total moving amount from a wide angle end to a telephotographic end of a lens group which contributes to a variable power is changed according to distance from a target object so as to make a ratio of an imaging magnification at the wide angle end to that at the telephotographic end in zooming when the object distance is finite coincide with a ratio of a focal length of a whole lens system at the wide angle end to that at the telephotographic end when the object distance is infinite.

2. A zoom lens comprising, successively from an object side, a first lens group having a positive refractive power, a second lens group having a negative refractive power, a third lens group having a negative refractive power, a fourth lens group having a positive refractive power, and a fifth lens group having a positive refractive power, said first, third, and fifth lens groups being fixed, said second lens group being moved in an optical axis direction so as to change a focal length of a whole lens system, said fourth lens being moved in the optical axis direction so as to correct fluctuation in an imaging position and to simultaneously correct change in the imaging position caused by change in object distance, wherein moving amount of said second lens group from the wide angle end to the telephotographic end decreases according to increase in distance from a target object such that a ratio of an imaging magnification at the wide angle end to that at the telephotographic end in zooming when the object distance is finite coincides with a ratio of the focal length of the whole lens system at the wide angle end to that at the telephotographic end when the object distance is infinite.

* * * * *